United States Patent
Sheya et al.

(10) Patent No.: US 9,608,894 B2
(45) Date of Patent: Mar. 28, 2017

(54) METHOD FOR TESTING RADIO FREQUENCY (RF) DATA PACKET SIGNAL TRANSCEIVERS IN A WIRELESS SIGNAL ENVIRONMENT

(71) Applicant: LITEPOINT CORPORATION, Sunnyvale, CA (US)

(72) Inventors: Steve Lawrence Sheya, Vernon Hills, IL (US); Soumyadeep Banerjee, Arlington Heights, IL (US); Ramakrishna Yellapantula, Vernon Hills, IL (US)

(73) Assignee: LitePoint Corporation, Sunnyvale, CA (US)

( * ) Notice: Subject to any disclaimer, the term of this patent is extended or adjusted under 35 U.S.C. 154(b) by 39 days.

(21) Appl. No.: 14/730,920

(22) Filed: Jun. 4, 2015

(65) Prior Publication Data

US 2016/0359717 A1 Dec. 8, 2016

(51) Int. Cl.
*H04L 12/26* (2006.01)
*H04L 29/06* (2006.01)
*H04W 52/14* (2009.01)

(52) U.S. Cl.
CPC .......... *H04L 43/50* (2013.01); *H04L 65/4076* (2013.01); *H04W 52/146* (2013.01)

(58) Field of Classification Search
None
See application file for complete search history.

(56) References Cited

U.S. PATENT DOCUMENTS

| | | |
|---|---|---|
| 2005/0176376 A1 | 8/2005 | Liu |
| 2011/0044296 A1* | 2/2011 | Zhang ............... H04B 7/0404 370/336 |
| 2012/0123723 A1 | 5/2012 | El-Hassan et al. |
| 2012/0231744 A1 | 9/2012 | Gregg et al. |

(Continued)

FOREIGN PATENT DOCUMENTS

WO 2015077087 A1 5/2015

OTHER PUBLICATIONS

Jul. 22, 2016—(WO) International Search Report and Written Opinion—App PCT/US2016/022423.

*Primary Examiner* — Hong Cho
(74) *Attorney, Agent, or Firm* — Banner & Witcoff, Ltd.

(57) ABSTRACT

Method for testing one or more of a group of radio frequency (RF) data packet signal transceiver devices under test (DUTs) with reduced signal interference from the remaining DUTs. A tester broadcasts a signal containing power control instructions about uplink signal power characteristics for communication with the tester. For example, for the LTE 3GPP standards, such characteristics could include power ramping step size, preamble initial received target power or maximum number of preamble transmissions for uplink signals transmitted from the DUTs. Following initiation of communication between the tester and one or more DUTs, the tester broadcasts a signal containing power control instructions to instruct the remaining DUTs to transmit any future signals with different uplink signal power characteristics. For the LTE 3GPP standards, such different characteristics could include reduced power ramping step size, reduced preamble initial received target power or reduced maximum number of preamble transmissions for uplink signals.

14 Claims, 2 Drawing Sheets

(56) References Cited

U.S. PATENT DOCUMENTS

2014/0160955 A1    6/2014  Lum et al.
2014/0194069 A1*   7/2014  Liu .................... H04B 17/29
                                                    455/67.14

* cited by examiner

METHOD FOR TESTING RADIO FREQUENCY (RF) DATA PACKET SIGNAL TRANSCEIVERS IN A WIRELESS SIGNAL ENVIRONMENT

BACKGROUND

The present invention relates to testing of one or more of multiple radio frequency (RF) data packet signal transceiver devices under test (DUTs), and in particular, to testing one or more such DUTs in a wireless signal environment with reduced signal interference from the remaining DUTs.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

One common and widely used example of such devices is mobile, or cellular, telephone system that complies with the Third Generation Partnership Project (3GPP) Long Term Evolution (LTE) standard, used for voice and data communications (e.g., sending and receiving of text messages, Internet browsing, etc.). Such devices are produced in large quantities and must be individually tested during manufacturing as well as after the actual manufacturing process prior to final shipment and sale. As part of such testing, it is highly desirable and advantageous to test such LTE devices in such a manner as to simulate behavior during normal operations, i.e., by operating multiple LTE devices simultaneously among themselves and one or more network access points (e.g., often referred to as a base station or eNodeB). Under such conditions, there will often be several LTE devices (e.g., often referred to as user equipment, or UE) operating. Under normal circumstances, multiple devices are in connected state, i.e., in active communication with the access point, while multiple other devices are in an idle state, i.e., not currently in active communication with the access point. Additionally, there are periodic transmissions from the idle, or non-connected, devices seeking to initiate communications with the access point. Such transmissions may occur randomly due to attempts by the device users to initiate communications via the access point, or for purposes of various forms of data updates between the device and network. (The LTE standard defines such interactions between devices and access points as parts of random access channel (RACH) interactions and specifies signal parameters related to such interactions.)

When multiple LTE devices are being tested concurrently, the test system must simulate behaviors consistent with performance under the applicable standards of the access point as it controls interactions with and responses to the devices. For example, in the course of such testing, the test system may instruct a device among a group of connected devices to transmit for the purpose of measuring one or more particular signal or data characteristics. However, if one or more devices among the idle devices simultaneously initiate a RACH transmission, such transmission can interfere with such measurements of signal characteristics.

No inherent mechanisms exist under the LTE standard for preventing or mitigating such instances of interference among active, or connected, devices and inactive, or idle, devices. While such potential for signal interference among such devices can be limited by limiting the number of devices being tested concurrently, this results in longer test times and reduced test efficiencies.

SUMMARY

In accordance with the presently claimed invention, a method is provided for testing one or more of a group of radio frequency (RF) data packet signal transceiver devices under test (DUTs) with reduced signal interference from the remaining DUTs. A tester broadcasts a signal containing power control instructions about uplink signal power characteristics for communication with the tester. For example, for the LTE 3GPP standards, such characteristics could include power ramping step size, preamble initial received target power or maximum number of preamble transmissions for uplink signals transmitted from the DUTs. Following initiation of communication between the tester and one or more DUTs, the tester broadcasts a signal containing power control instructions to instruct the remaining DUTs to transmit any future signals with different uplink signal power characteristics. For the LTE 3GPP standards, such different characteristics could include reduced power ramping step size, reduced preamble initial received target power or reduced maximum number of preamble transmissions for uplink signals.

In accordance with one embodiment of the presently claimed invention, a method for testing one or more of a plurality of radio frequency (RF) data packet signal transceiver devices under test (DUTs) with reduced signal interference from remaining ones of the plurality of DUTs includes:

providing a tester adapted to communicate with a plurality of DUTs via a plurality of RF signals conveyed by a radiative RF signal path between the tester and the plurality of DUTs, including a plurality of downlink signals from the tester and respective one or more uplink signals from each one of the plurality of DUTs;

broadcasting, with the tester, a first downlink signal including first uplink signal power control instructions;

receiving, with the tester from a first one of the plurality of DUTs, a first uplink signal having a first uplink signal power in conformance with the first uplink signal power control instructions; and following the receiving of the first uplink signal,
broadcasting, with the tester, a second downlink signal, including second uplink signal power control instructions,
transmitting, with the tester, and receiving, from the first one of the plurality of DUTs, further downlink and uplink signals, respectively, in conformance with the first uplink signal power control instructions, and
receiving, within the radiative RF signal path from remaining ones of the plurality of DUTs, respective uplink signals having respective uplink signal powers in conformance with the second uplink signal power control instructions.

In accordance with another embodiment of the presently claimed invention, a method for testing one or more of a plurality of radio frequency (RF) data packet signal transceiver devices under test (DUTs) with reduced signal interference from remaining ones of the plurality of DUTs includes:

provviding a plurality of DUTs adapted to communicate with a tester via a plurality of RF signals conveyed by a radiative RF signal path between the plurality of DUTs and the tester, including a plurality of downlink signals from the tester and respective one or more uplink signals from each one of the plurality of DUTs;

receiving, with the plurality of DUTs, a first downlink signal including first uplink signal power control instructions;

transmitting, with a first one of the plurality of DUTs, a first uplink signal having a first uplink signal power in conformance with the first uplink signal power control instructions; and following the transmitting of the first uplink signal,
receiving, with at least a portion of the plurality of DUTs, a second downlink signal, including second uplink signal power control instructions,
transmitting, with the first one of the plurality of DUTs, and receiving, from the tester, further uplink and downlink signals, respectively, in conformance with the first uplink signal power control instructions, and
transmitting, with remaining ones of the plurality of DUTs, respective uplink signals having respective uplink signal powers in conformance with the second uplink signal power control instructions.

DETAILED DESCRIPTION

Figure 1:
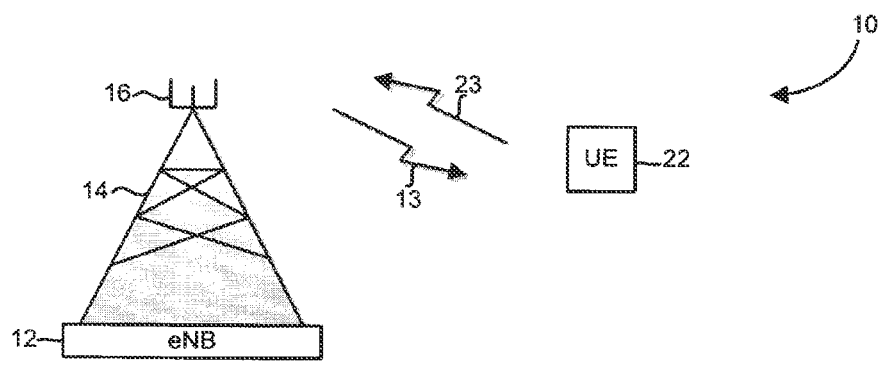
FIG. 1 depicts a typical operating environment for a LTE device and its access point.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies (e.g., IEEE 802.11a/b/g/n/ac, 3GPP LTE, and Bluetooth). The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested (TX tests) by having them send packets to the test system, which then evaluates the physical characteristics of the signals sent by the DUT.

For example, testing of wireless devices typically involves testing of the receiving and transmitting subsystems of each device. Receiver subsystem testing includes sending a prescribed sequence of test data packet signals to a DUT using different frequencies, power levels, and/or modulation types to determine if its receiving subsystem is operating properly. Similarly, transmitting subsystem testing includes having the DUT send test data packet signals at a variety of frequencies, power levels, and/or modulation types to determine if its transmitting subsystem is operating properly.

During normal operation of an LTE system (e.g., with multiple devices and one or more access points), devices in an non-connected state with respect to an access point may transmit a signal to determine accessibility of the access point. However, in a case where a test system is simulating an access point and using 3GPP LTE specified interactions with another device, the concurrent transmission of a non-connected device seeking connection with the access point can interfere. During normal real world operation, such interference is expected and inconsequential. However, during testing operation where a test system is attempting to solicit a signal from a connected device for the purpose of measuring its signal characteristic(s), interference from an idle-state device can and generally will negatively affect accuracy of any test measurements.

As discussed in more detail below, embodiments of the presently claimed invention include use of a test system employing signaling to effectively control non-connected devices in such a manner as to cause them to reduce uplink transmissions (e.g., RACH signals) while measuring uplink transmissions on connected devices. For example, if measurement of uplink transmissions of device A is desired, the test system (e.g., test equipment configured to simulate certain operations of a base station or eNodeB) uses signaling to limit allowable transmissions of other devices in potential or current communication with the test system. This ensures that measurements taken for device A originate from device A and limits potentially overlapping or interfering transmissions from other devices.

More particularly, when testing an LTE system with a multitude of devices in an idle state and an uplink transmission measurement is desired for device A, it is desirable to ensure that other devices in potential or actual communication with the test system cease or limit their transmissions until the measurement for device A is complete. This can be accomplished by broadcasting certain RACH parameters to idle devices via the test system. For example, the test system would bring device A into a connected state, then proceed to broadcast RACH parameters in a System Information Block 2 (SIB 2) message instructing idle state devices to limit their transmissions. Defined signal parameters, such as "powerRampingStep", "preambleInitialReceivedTargetPower" and "preambleTransMax", can be used to limit the transmission power and transmission attempts for a device seeking to connect, or attach, to the test system. Using the standard defined minimum values for these parameters, the test system can instruct idle state devices to use the RACH with very low transmission power to minimize any impacts on the desired uplink measurements of the device currently being tested.

Referring to FIG. 1, a typical operating environment 10 for an LTE system includes a base station, or eNB, 12, with a radio frequency (RF) radiating system including one or more antennae elements 16, e.g., supported by a tower 14 or other support structure. The eNB 12 communicates with the mobile devices (UE) 22 via downlink signals 13 from the eNB 12 to the UE 22 and uplink signals 23 from the UE 22 to the eNB 12. (While only one UE 22 is depicted in this figure, it will be readily appreciated that a typical operating environment 10 includes multiple mobile devices 22.)

Figure 2:
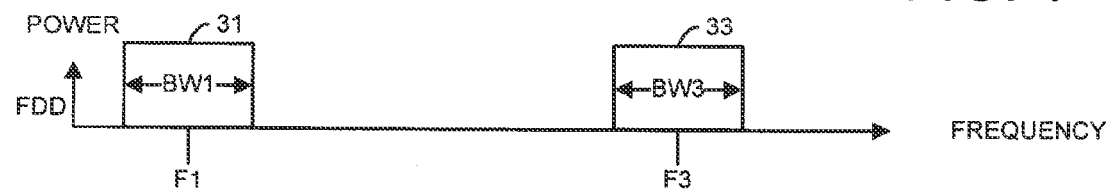
FIG. 2 depicts frequency spectrums for LTE devices using frequency and time division duplexing signals.

Referring to FIG. 2, LTE systems operate using one of two different frequency schemes: frequency division duplex (FDD) with lower 31 and upper 33 frequency bands having respective nominal center frequencies F1, F3 and defined bandwidths BW1, BW3, with most systems using the lower frequency band 31 for uplink signals 23 and the upper frequency band 33 for downlink signals 13; and time division duplex (TDD) having a single frequency band 32 with a nominal center frequency F2 and defined bandwidth BW2, with the uplink 23 and downlink 13 signals occupying alternating sequences of data packets within the signal.

Figure 3:
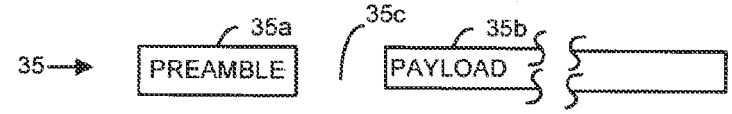
FIG. 3 depicts the general contents of a data packet signal used by LTE devices.

Referring to FIG. 3, the uplink 23 and downlink 13 signals include data packets 35, each of which includes preamble data 35a and payload data 35b. The preamble data 35a is typically transmitted by the UE 22 to request resources from the eNB 12, and is transmitted first. The payload data 35b includes the data to be transferred between the eNB 12 and UE 22, and is transmitted after the preamble and following a time interval 35c to allow for reception of an acknowledgment (ACK) from the eNB 12, in the case of an uplink transmission, or from the UE 22 in the case of a downlink transmission.

In accordance with the LTE signal standard, an LTE system communicates using control channels and data channels. A control channel carries control information used to make, maintain and terminate signal connections, and is used for transferring control plane information. A data channel carries traffic information, and is used for transferring user plane information. The LTE channel structure is hierarchical, with three channel types defined: logical, transport, and physical. Each channel type associates with a service access point between different layers, with the channels used by lower layers to provide services to upper layers.

Logical channels control what is transmitted, with each logical channel defined by the type of information it carries. In LTE, two types of logical channels, i.e., control channels and traffic channels, are defined in accordance with the services they provide.

Transport channels control how to transmit data. A transport channel is characterized by how and with what characteristics data is transferred over the air.

Physical channels provide actual transmission of data, with each physical channel mapping to a set of resource elements (REs) in the time frequency grid that carry information from upper layers. A physical channel is formed from REs, which are the smallest units of radio resources (one subcarrier per symbol), and resource blocks (RBs), which are the smallest block of resources that can be allocated to a UE by the eNB (12 subcarriers for 7 symbols). A RE is one carrier by one OFDM (Orthogonal Frequency Division Multiplexing) symbol, and typically will carry one (or two with spatial multiplexing) modulated symbols. A RB is a collection of REs, and represents the smallest number of resources that can be allocated in the frequency domain.

Figure 4:
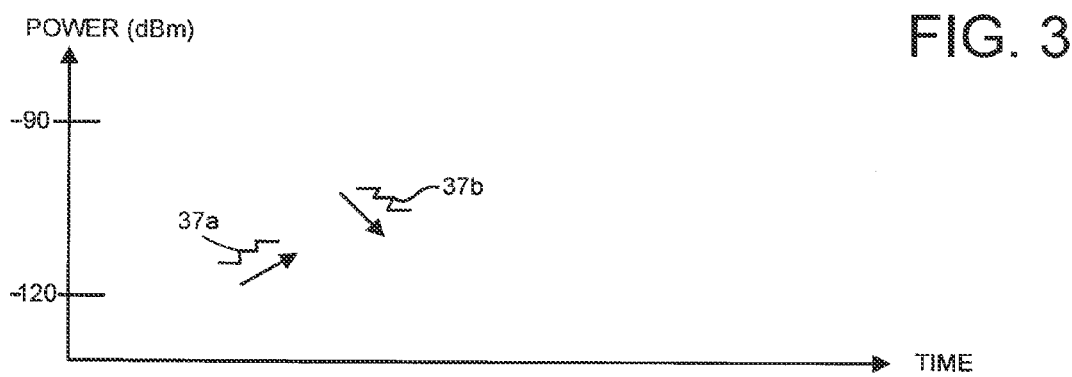
FIG. 4 depicts changes in power over time during typical operations of LTE devices.

Referring to FIG. 4, downlink 13 and uplink 23 signals (FIG. 1) have respective signal powers that can be controlled as needed or desired based on signal path conditions within the operating environment 10. Of particular interest are the power levels of the uplink signals 23 from the user devices 22, since it is desirable that they transmit only as much power as necessary to maintain effective communications with the eNB 12. Prescribed transmit power levels range from a minimum of −60 dBm to a maximum of +23 dBm. This power level is controllable (discussed in more detail below) in discrete power level steps 37a, 37b for increasing or decreasing signal power as necessary.

Figure 5:
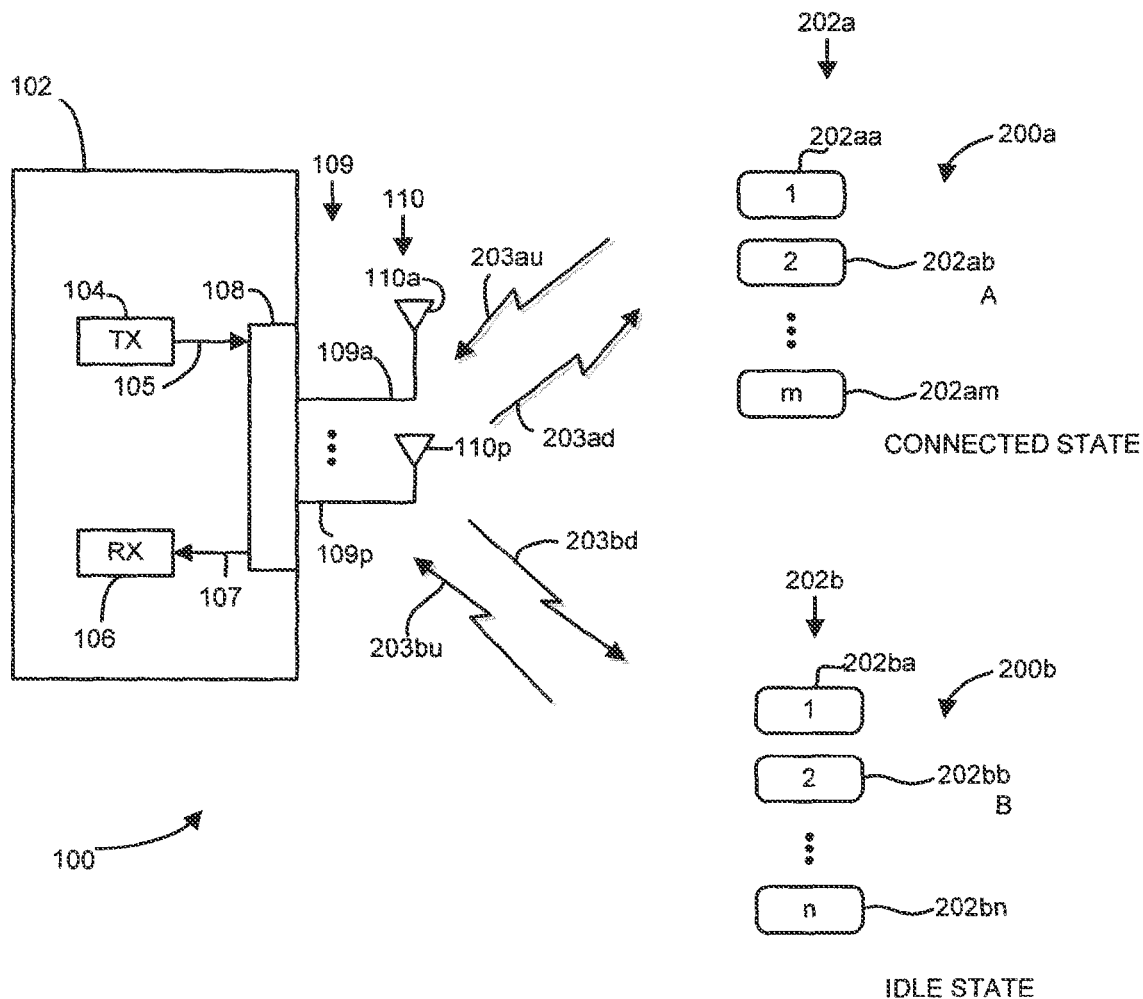
FIG. 5 depicts a testing environment for multiple LTE devices in accordance with an exemplary embodiment of the presently claimed invention.

Referring to FIG. 5, in accordance with practices of exemplary embodiments of the presently claimed invention, a testing environment 100 includes a test system 102 and multiple DUTs (UEs) 202a, 202b. These DUTs 202a, 202b include one or more devices 200a operating in connected state(s) with the test system 102, and one or more devices 200b operating in idle state(s). The test system 102 includes signal transmitter circuitry 104 and signal receiver circuitry 106 for providing a transmit signal 105 and receiving a receive signal 107 via signal routing circuitry 108 (e.g., signal switching or multiplexing circuitry), which conveys such signals via signal paths 109 to and from an array 110 of antenna elements. It is via these antenna elements 110 that downlink signals 203ad, 203bd are transmitted to the DUTs 200a, 200b, and uplink signals 203au, 203bu are received from the DUTs 200a, 200b.

Such testing environment 100 is a radiative, or wireless, testing environment, and is preferably implemented in some form of isolated testing environment, such as a radio frequency (RF) shielded enclosure to minimize electromagnetic interference (EMI) from signal sources other than those of the devices being tested and the test system itself.

Initially, the test system 102, which simulates operation of the eNB 12 (FIG. 1) for testing purposes, transmits the downlink signals 203ad, 203bd via a downlink physical broadcast channel (PBCH). These signals carry system information for the DUTs 200a, 200b required to access and communicate with the network. This system information is contained in a master information block (MIB), providing physical layer information for network access. Included are system information blocks (SIBs) which contain information, such as whether or not a UE is allowed to access the LTE cell (SIB1), common channel as well as shared channel information, and uplink power control and preamble power ramping information (SIB2).

As a result, one or more DUTs 202a, using this system information, initiate communications with the test system 102, and thereby enter respective connected states of communication. The test system 102 can then perform a desired sequence of test steps during which various signal characteristics of the connected-state DUTs 202a are measured. (While it is possible to have multiple connected-state DUTs 202a during testing, depending upon the signal characteristic(s) being tested, generally it is desirable to have a single connected-state DUT during testing to ensure that the test results can be reliably be associated with a particular DUT.)

Meanwhile, the test system 102 also transmits RACH parameters via the PBCH random access channel via another system information block (SIB2) to define the signal transmission parameters for the DUTs 202b still in idle states. Such parameters can include one or more of "power ramping step" (with possible values of 0, 2, 4 or 6 dB), "preamble initial received target power" (with possible values from −120 dbm to −90 dbm and a step size of 2 db), or "preamble transmax" (with possible values of 3, 4, 5, 6, 7, 8, 10, 20, 50, 100 or 200 maximum preamble transmissions). Based on these one or more power parameters, the idle state DUTs 2002b transmit their future uplink signals 203bu with minimal transmissions and/or minimal power levels, thereby minimizing interference with reception by the test system 102 of uplink signals 203au from the connected state DUT(s) 202a.

Following completion of any desired or necessary tests by the test system 102, respective ones of the connected-state DUTs 202a receive a signal from the test system 102 informing it that such DUT not access, or "re-attach", to the test system 102, thereby allowing other DUTs 202b from the idle-state group 200b to access and connect with the test system 102 for testing.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing one or more of a plurality of radio frequency (RF) data packet signal transceiver devices under test (DUTs) with reduced signal interference from remaining ones of said plurality of DUTs, comprising:
   providing a tester adapted to communicate with a plurality of DUTs via a plurality of RF signals conveyed by a radiative RF signal path between said tester and said plurality of DUTs, including a plurality of downlink signals from said tester and respective one or more uplink signals from each one of said plurality of DUTs;
   broadcasting, with said tester, a first downlink signal including first uplink signal power control instructions;
   receiving, with said tester from a first one of said plurality of DUTs, a first uplink signal having a first uplink signal power in conformance with a connected state of said first one of said plurality of DUTs and said first uplink signal power control instructions; and
   following said receiving of said first uplink signal, broadcasting, with said tester, a second downlink signal, including second uplink signal power control instructions,
   transmitting, with said tester, and receiving, from said first one of said plurality of DUTs, further downlink and uplink signals, respectively, in conformance with said first uplink signal power control instructions, and
   receiving, within said radiative RF signal path from remaining ones of said plurality of DUTs, respective uplink signals having respective uplink signal powers in conformance with idle states of said remaining ones of said plurality of DUTs and said second uplink signal power control instructions.

2. The method of claim 1, wherein said first and second uplink signal power control instructions comprise respective instructions related to at least one of power ramping step size, preamble initial received target power or maximum number of preamble transmissions for said one or more uplink signals from said plurality of DUTs.

3. The method of claim 1, wherein said transmitting, with said tester, and receiving, from said first one of said plurality of DUTs, further downlink and uplink signals, respectively, in conformance with said first uplink signal power control instructions, and said receiving, within said radiative RF signal path from remaining ones of said plurality of DUTs, respective uplink signals having respective uplink signal powers in conformance with said second uplink signal power control instructions are performed concurrently.

4. A method for testing one or more of a plurality of radio frequency (RF) data packet signal transceiver devices under test (DUTs) with reduced signal interference from remaining ones of said plurality of DUTs, comprising:
   providing a tester adapted to communicate with a plurality of DUTs via a plurality of RF signals conveyed by a radiative RF signal path between said tester and said plurality of DUTs including a plurality of downlink signals from said tester and respective one or more uplink signals from each one of said plurality of DUTs;
   broadcasting, with said tester, a first downlink signal including first uplink signal power control instructions;
   receiving, with said tester from a first one of said plurality of DUTs, a first uplink signal having a first uplink signal power in conformance with said first uplink signal power control instructions;
   following said receiving of said first uplink signal, broadcasting, with said tester, a second downlink signal, including second uplink signal power control instructions;
   transmitting, with said tester, and receiving, from said first one of said plurality of DUTs, further downlink and uplink signals, respectively, in conformance with said first uplink signal power control instructions, and
receiving, within said radiative RF signal path from remaining ones of said plurality of DUTs, respective uplink signals having respective uplink signal powers in conformance with said second uplink signal power control instructions; and
following said transmitting, with said tester, and receiving, from said first one of said plurality of DUTs, further downlink and uplink signals, respectively, in conformance with said first uplink signal power control instructions for a time interval:
terminating said transmitting, with said tester, and receiving, from said first one of said plurality of DUTs, further downlink and uplink signals, respectively;
broadcasting, with said tester, a third downlink signal including third uplink signal power control instructions;
receiving, with said tester from a second one of said plurality of DUTs, a second uplink signal having a second uplink signal power in conformance with said third uplink signal power control instructions; and
following said receiving of said second uplink signal,
broadcasting, with said tester, a fourth downlink signal, including fourth uplink signal power control instructions,
transmitting, with said tester, and receiving, from said second one of said plurality of DUTs, further downlink and uplink signals, respectively, in conformance with said third uplink signal power control instructions, and
receiving, within said radiative RF signal path from remaining ones of said plurality of DUTs, respective uplink signals having respective uplink signal powers in conformance with said fourth uplink signal power control instructions.

5. The method of claim 4, wherein said first, second, third and fourth uplink signal power control instructions comprise respective instructions related to at least one of power ramping step size, preamble initial received target power or maximum number of preamble transmissions for said one or more uplink signals from said plurality of DUTs.

6. The method of claim 4, wherein:
said transmitting, with said tester, and receiving, from said first one of said plurality of DUTs, further downlink and uplink signals, respectively, in conformance with said first uplink signal power control instructions, and said receiving, within said radiative RF signal path from remaining ones of said plurality of DUTs, respective uplink signals having respective uplink signal powers in conformance with said second uplink signal power control instructions are performed concurrently during a first time interval; and
said transmitting, with said tester, and receiving, from said second one of said plurality of DUTs, further downlink and uplink signals, respectively, in conformance with said third uplink signal power control instructions, and said receiving, within said radiative RF signal path from remaining ones of said plurality of DUTs, respective uplink signals having respective uplink signal powers in conformance with said fourth uplink signal power control instructions are performed concurrently during a second time interval subsequent to said first time interval.

7. The method of claim 4, wherein said terminating said transmitting, with said tester, and receiving, from said first one of said plurality of DUTs, further downlink and uplink signals, respectively, comprises transmitting, with said tester, a downlink signal including a disconnect instruction for said first one of said plurality of DUTs to prevent transmission of another uplink signal by said first one of said plurality of DUTs.

8. A method for testing one or more of a plurality of radio frequency (RF) data packet signal transceiver devices under test (DUTs) with reduced signal interference from remaining ones of said plurality of DUTs, comprising:
providing a plurality of DUTs adapted to communicate with a tester via a plurality of RF signals conveyed by a radiative RF signal path between said plurality of DUTs and said tester, including a plurality of downlink signals from said tester and respective one or more uplink signals from each one of said plurality of DUTs;
receiving, with said plurality of DUTs, a first downlink signal including first uplink signal power control instructions;
transmitting, with a first one of said plurality of DUTs, a first uplink signal having a first uplink signal power in conformance with a connected state of said first one of said plurality of DUTs and said first uplink signal power control instructions; and
following said transmitting of said first uplink signal,
receiving, with at least a portion of said plurality of DUTs, a second downlink signal, including second uplink signal power control instructions,
transmitting, with said first one of said plurality of DUTs, and receiving, from said tester, further uplink and downlink signals, respectively, in conformance with said first uplink signal power control instructions, and
transmitting, with remaining ones of said plurality of DUTs, respective uplink signals having respective uplink signal powers in conformance with idle states of said remaining ones of said plurality of DUTs and said second uplink signal power control instructions.

9. The method of claim 8, wherein said first and second uplink signal power control instructions comprise respective instructions related to at least one of power ramping step size, preamble initial received target power or maximum number of preamble transmissions for said one or more uplink signals from said plurality of DUTs.

10. The method of claim 8, wherein said transmitting, with said first one of said plurality of DUTs, and receiving, from said tester, further uplink and downlink signals, respectively, in conformance with said first uplink signal power control instructions, and said transmitting, with remaining ones of said plurality of DUTs, respective uplink signals having respective uplink signal powers in conformance with said second uplink signal power control instructions are performed concurrently.

11. A method for testing one or more of a plurality of radio frequency (RF) data packet signal transceiver devices under test (DUTs) with reduced signal interference from remaining ones of said plurality of DUTs, comprising:
providing a plurality of DUTs adapted to communicate with a tester via a plurality of RF signals conveyed by a radiative RF signal path between said plurality of DUTs and said tester, including a plurality of downlink signals from said tester and respective one or more uplink signals from each one of said plurality of DUTs;
receiving, with said plurality of DUTs, a first downlink signal including first uplink signal power control instructions;
transmitting, with a first one of said plurality of DUTs, a first uplink signal having a first uplink signal power in conformance with said first uplink signal power control instructions;
following said transmitting of said first uplink signal,
receiving, with at least a portion of said plurality of DUTs, a second downlink signal, including second uplink signal power control instructions, transmitting, with said first one of said plurality of DUTs, and receiving, from said tester, further uplink and downlink signals, respectively, in conformance with said first uplink signal power control instructions, and transmitting, with remaining ones of said plurality of DUTs, respective uplink signals having respective uplink signal powers in conformance with said second uplink signal power control instructions; and following said transmitting, with said first one of said plurality of DUTs, and receiving, from said tester, further uplink and downlink signals, respectively, in conformance with said first uplink signal power control instructions for a time interval:

terminating said transmitting, with said first one of said plurality of DUTs, and receiving, from said tester, further uplink and downlink signals, respectively;

receiving, with at least a portion of remaining ones of said plurality of DUTs, a third downlink signal including third uplink signal power control instructions;

transmitting, with a second one of said plurality of DUTs, a second uplink signal having a second uplink signal power in conformance with said third uplink signal power control instructions; and following said transmitting of said second uplink signal, receiving; with at least a portion of said plurality of DUTs, a fourth downlink signal, including fourth uplink signal power control instructions, transmitting, with said second one of said plurality of DUTs, and receiving, from said tester, further uplink and downlink signals, respectively, in conformance with said third uplink signal power control instructions, and transmitting, with remaining ones of said plurality of DUTs, respective uplink signals having respective uplink signal powers in conformance with said fourth uplink signal power control instructions.

12. The method of claim 11, wherein said first, second, third and fourth uplink signal power control instructions comprise respective instructions related to at least one of power ramping step size, preamble initial received target power or maximum number of preamble transmissions for said one or more uplink signals from said plurality of DUTs.

13. The method of claim 11, wherein:

said transmitting, with said first one of said plurality of DUTs, and receiving, from said tester, further uplink and downlink signals, respectively, in conformance with said first uplink signal power control instructions, and said transmitting, with remaining ones of said plurality of DUTs, respective uplink signals having respective uplink signal powers in conformance with said second uplink signal power control instructions are performed concurrently during a first time interval; and said transmitting, with said second one of said plurality of DUTs, and receiving, from said tester, further uplink and downlink signals, respectively, in conformance with said third uplink signal power control instructions, and said transmitting, with remaining ones of said plurality of DUTs, respective uplink signals having respective uplink signal powers in conformance with said fourth uplink signal power control instructions are performed concurrently during a second time interval subsequent to said first time interval.

14. The method of claim 11, wherein said terminating said transmitting, with said first one of said plurality of DUTs, and receiving, from said tester, further uplink and downlink signals, respectively, comprises receiving, with said first one of said plurality of DUTs, a downlink signal from said tester including a disconnect instruction for said first one of said plurality of DUTs to prevent transmission of another uplink signal by said first one of said plurality of DUTs.

* * * * *